UNITED STATES PATENT OFFICE.

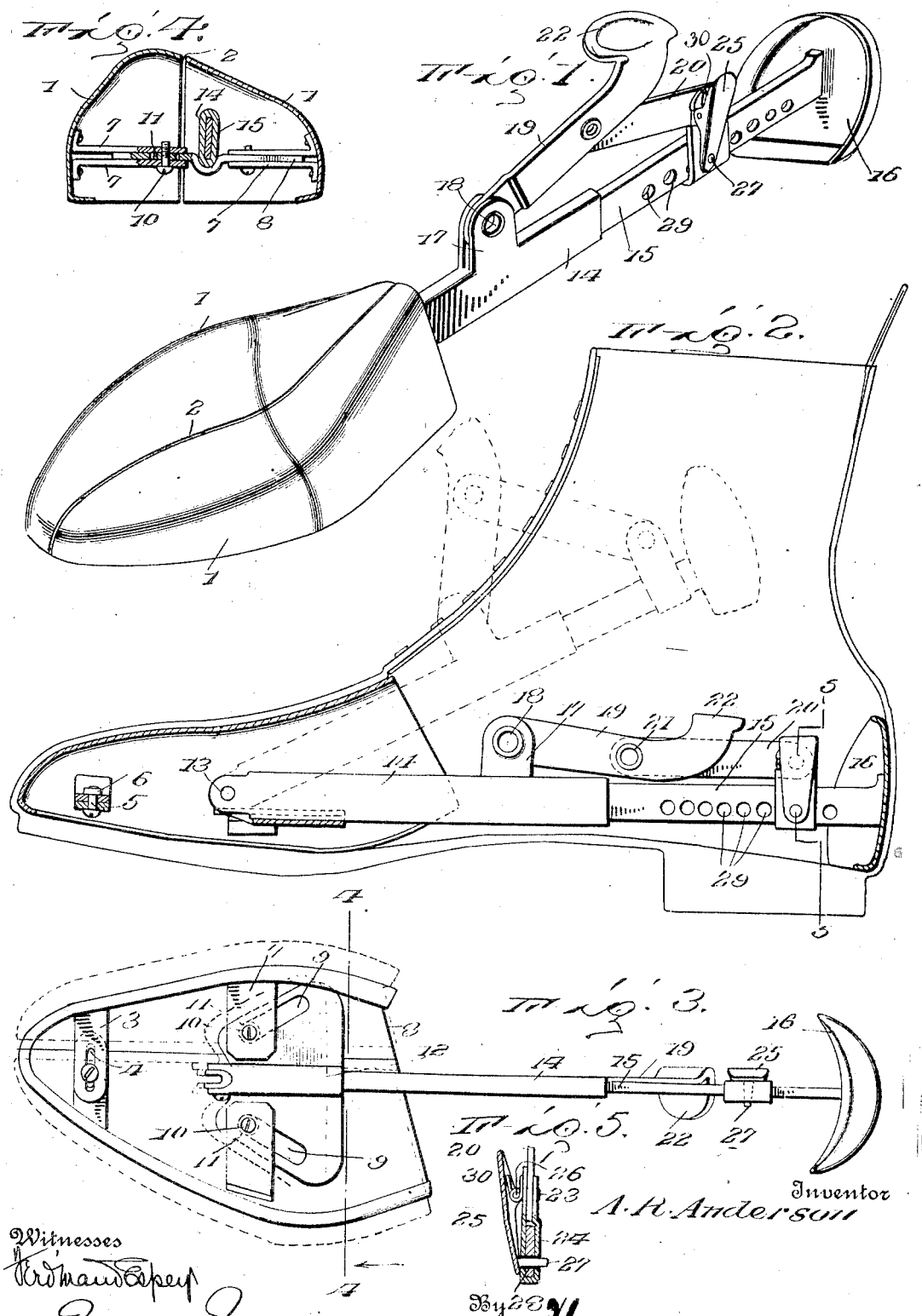

ANDREW R. ANDERSON, OF ARLINGTON, NEW JERSEY.

SHOE-TREE.

1,116,666.  Specification of Letters Patent.  Patented Nov. 10, 1914.

Application filed April 25, 1912. Serial No. 693,109.

*To all whom it may concern:*

Be it known that I, ANDREW R. ANDERSON, citizen of the United States, residing at Arlington, in the county of Hudson and State of New Jersey, have invented certain new and useful Improvements in Shoe-Trees, of which the following is a specification.

This invention relates to shoe-trees, and has as its primary object to provide a tree which will readily adapt itself to shoes of different shapes and which may be readily and quickly adjusted to fit within shoes of different sizes.

The invention further aims to so arrange and connect the toe former sections that they will readily conform to the inner contour of both pointed and broad toed shoes.

The invention aims further to so construct the expanding means for the tree that it may be readily and quickly manipulated to expand or contract the tree and may be relatively adjusted so as to position the heel former section at a greater or less distance from the toe former sections.

For a full understanding of the invention reference is to be had to the following description and accompanying drawing, in which:—

Figure 1 is a perspective view of the tree embodying the present invention. Fig. 2 is a vertical longitudinal sectional view therethrough, the tree being illustrated as arranged in a shoe, and the shoe being shown in light lines. Fig. 3 is a bottom plan view of the tree. Fig. 4 is a vertical transverse sectional view on the line 4—4 of Fig. 3. Fig. 5 is a vertical transverse sectional view on the line 5—5 of Fig. 2.

Corresponding and like parts are referred to in the following description and indicated in all the views of the accompanying drawing by the same reference characters.

In the drawing, the toe-former sections are indicated by the numeral 1 and are preferably formed from sheet metal stamped or pressed to conform generally to the contour of the forepart of the human foot. These sections are divided substantially at the longitudinal median line of the tree, their matching edges being indicated by the numeral 2. The toe-former sections are as usual connected and arranged for adjustment toward and from each other, so that they may be expanded within the shoe into which the tree is inserted and in order to prevent overlapping of the matching edges of the sections and to limit the separation of the sections at their forward ends, the said sections are formed upon their inner sides with inwardly projecting ears 3 each formed with a slot 4 and these ears overlap one another as clearly shown in Figs. 2 and 3 of the drawing, and a screw 5 is inserted through the slots 4 and has threaded upon it a nut 6. In this manner, the sections at their forward ends are prevented from relative vertical displacement and the engagement of the screw 5 at the end-walls of the slots 4 will of course limit the degree at which the sections at their said forward ends may be separated. Projecting inwardly from the wall of each section 1, adjacent the rear end thereof is a pair of spaced ears 7 and slidably received between the ears of the two pairs is a spreader-plate 8 formed with diagonal slots 9 which diverge rearwardly. Screws or rivets 10 are secured through the ears of each pair 7 and through washers 11 which are received within the slots 9 in the spreader-plate 8. At this point it will be apparent that when the spreader-plate is moved forwardly between the sections 1, these sections will be forced apart due to the angular disposition of the slots 9, and that on the other hand when the spreader is drawn rearwardly the sections 1 will be drawn together. For a purpose which will be presently made apparent, the spreader-plate 8 is stamped or otherwise formed with a channel 12 terminating at the front and rear edges of the said plate, and at the forward end of this channel, there is pivoted, as at 13, one section of the shank of the tree. This section of the tree-shank is indicated by the numeral 14 and is in the nature of a flat-sided sleeve. This section of the shank being pivoted at its forward end, may be swung as indicated in the full and dotted line positions in Fig. 2 of the drawing so that while when the tree is arranged within a shoe, the shank section will assume the full line position shown in the said figure and will rest at its forward end in the channel 12, when the tree is to be inserted into the shoe, the said section will be swung up to about the dotted line position. Telescopically received within the section 14 is the other section of the shank which is indicated by the numeral 15 and supports at its rear end, a heel-former plate 16 shaped to conform to the interior contour of the heel of an ordinary shoe. In connection with the two sections of the shank, means is provided for extending and retracting the section 15 so as to force the heel former plate 16 away from the toe former sections or draw the said plate 16 toward the said sections, and this means will now be described.

The section 14 of the shank is formed with a pair of upstanding ears 17 between which is pivoted as at 18, the forward end of a toggle-link, this link being indicated by the numeral 19. The other toggle-link is indicated at 20 and is pivoted as at 21 to the first mentioned link 19. The link 19 is extended beyond the pivot 21 and is formed or provided with a laterally projecting finger-piece, by means of which this link may be manipulated to open or close the toggle. The rear end of the toggle-link 20 is pivoted as at 23 between the spaced portions of a yoke 24 which is slidably fitted upon the shank section 15. A latch finger 25 is pivoted as at 26 upon one of the spaced portions of the yoke 24 and is provided at its lower end with a laterally projecting stud 27 arranged to project through openings 28 formed in the said spaced portions of the yoke and detachably through openings 29 which extend in a series lengthwise of the section 15. A spring 30 is assembled with the pivot 26 of the latch-finger and serves to normally hold the finger with its stud 27 engaging through the said openings.

From the foregoing description of the invention it will be understood that when the tree is to be fitted into a shoe, the upper end of the latch-finger 25 is first pressed so as to disengage the stud 27 from the openings 28 and 29 and the shank section 15 is then slid forwardly or rearwardly so as to adjust the device as regards its length, whereby to adapt it to the particular shoe into which it is to be inserted. After the shank sections have been properly adjusted, the shank is swung up to assume about the dotted line position shown in Fig. 2 of the drawing, the toggle being substantially closed and the toe former sections are then inserted into the shoe. After these sections have been properly positioned the shank is lowered into the shoe carrying with it the heel former plate 16. Pressure is then exerted upon the finger-piece 22 of the toggle-link 19 thereby opening the toggle and forcing the shank section 15 rearwardly. This extension of the shank serves to cause the heel former plate 16 to bear firmly against the inner surface of the heel of the shoe and consequently the shank 14 is forced forwardly moving with it the spreader-plate 8.

Having thus described the invention what is claimed as new is:—

1. In a shoe tree, a toe former, a heel former, a shank connecting the formers and comprising a tubular section connected to one of the formers and a section connected to the other former and slidably fitting within the tubular section, a toggle link pivoted to the tubular section, a member slidably adjustable upon the other section of the shank, and a toggle link pivoted to the said member and to the first mentioned toggle link.

2. In a shoe tree, a toe former, a heel former, a shank connecting the formers and including a tubular section connected to one of the formers and a section connected to the other former and slidably fitting within the tubular section, a toggle link pivoted to the other section, the other section of the shank having a series of sockets, a yoke slidably fitted thereon, a latch carried by the yoke and engageable interchangeably in the sockets, and a toggle link pivoted to the yoke and to the first mentioned toggle link.

3. In a shoe tree, a toe former, a heel former, a shank connecting the formers, the toe former comprising sections connected for relative movement, ears projecting inwardly from the sections, and a plate to which the shank is pivoted, the said plate being provided with slots and the ears being provided with pins projecting through the slots, the plate being formed centrally and longitudinally with a depression arranged to receive the edge portion of the shank when the shank is in position to extend the said formers.

In testimony whereof I affix my signature in presence of two witnesses.

ANDREW R. ANDERSON. [L. S.]

Witnesses:
EDWARD O'HARA,
RICHARD E. SMITH, Jr.